United States Patent
Hung et al.

(10) Patent No.: US 8,781,048 B2
(45) Date of Patent: Jul. 15, 2014

(54) APPARATUS FOR SYNCHRONIZATION OF AUDIO DATA AND VISUAL DATA AND METHOD THEREFOR

(71) Applicant: KeyStone Semiconductor Corp., Hsinchu (TW)

(72) Inventors: Shao-Hsuan Hung, Kaohsiung (TW); Shih-Wei Chang, New Taipei (TW)

(73) Assignee: KeyStone Semiconductor Corp., Hsinchu (TW)

( * ) Notice: Subject to any disclaimer, the term of this patent is extended or adjusted under 35 U.S.C. 154(b) by 64 days.

(21) Appl. No.: 13/688,233

(22) Filed: Nov. 29, 2012

(65) Prior Publication Data

US 2013/0188682 A1    Jul. 25, 2013

(30) Foreign Application Priority Data

Jan. 20, 2012 (CN) .......................... 2012 1 0022676

(51) Int. Cl.
*H03K 5/07* (2006.01)
*H04L 7/00* (2006.01)
*H04J 3/06* (2006.01)
*H04H 20/28* (2008.01)

(52) U.S. Cl.
USPC ............ 375/354; 375/359; 370/487; 370/516

(58) Field of Classification Search
CPC .. H03L 7/00; H04N 21/2368; H04N 21/4341; H04N 7/52; H04N 7/56; H04L 12/2801; H04J 3/0632; H04J 3/0626; H04J 3/006

USPC .......... 370/487, 503, 516–519; 375/354, 359; 700/94; 704/270; 348/515; 455/3.06

See application file for complete search history.

(56) References Cited

U.S. PATENT DOCUMENTS

| | | | |
|---|---|---|---|
| 8,121,534 B2* | 2/2012 | Mantel et al. | 455/3.02 |
| 8,595,748 B1* | 11/2013 | Haggerty et al. | 719/313 |
| 2011/0090897 A1* | 4/2011 | Johnson et al. | 370/350 |
| 2012/0038826 A1* | 2/2012 | Logvinov et al. | 348/512 |
| 2012/0162512 A1* | 6/2012 | Johnson et al. | 348/515 |
| 2012/0189069 A1* | 7/2012 | Iannuzzelli et al. | 375/259 |

* cited by examiner

*Primary Examiner* — Victor Kostak
(74) *Attorney, Agent, or Firm* — Jianq Chyun IP Office

(57) ABSTRACT

An apparatus for synchronizing audio data and visual data and a method therefor are provided. The apparatus includes a splitter, a synchronization unit coupled to the splitter, an audio control unit coupled to the splitter and the synchronization unit, and a visual data processing unit coupled to the splitter and the synchronization unit. The splitter receives an application layer data frame including audio data and visual data and splits the visual data from the audio data. The synchronization unit receives audio timing information of the audio data and acquires synchronization information according to the audio timing information and external timing information. The audio control unit receives and temporarily stores the audio data and outputs the audio data according to the synchronization information. The visual data processing unit analyzes and temporarily stores the visual data and outputs the visual data together with the audio data according to the synchronization information.

13 Claims, 3 Drawing Sheets

APPARATUS FOR SYNCHRONIZATION OF AUDIO DATA AND VISUAL DATA AND METHOD THEREFOR

CROSS-REFERENCE TO RELATED APPLICATION

This application claims the priority benefit of China application serial no. 201210022676.1, filed on Jan. 20, 2012. The entirety of the above-mentioned patent application is hereby incorporated by reference herein and made a part of this specification.

BACKGROUND OF THE INVENTION

1. Field of the Invention

The invention relates to an apparatus and a method for processing multimedia data. More particularly, the invention relates to an apparatus and a method for synchronizing audio data and visual data.

2. Description of Related Art

Development of science and technologies leads to the increasing demand for quality of multimedia. Accordingly, the digital audio broadcasting (DAB) standard, a digital technology standard for broadcasting audio streams, has been developed. In comparison with the conventional analog broadcasts, e.g., the analog FM radio, the DAB broadcasts are characterized by high fidelity as well as resistance to noise and co-channel interference. Further, a DAB ensemble is able to include multiple channels within one single bandwidth. Recently, new standards (e.g., the digital audio broadcasting plus (DAB+) standard) that resolve issues existing in the old standard have been widely adopted over various countries.

In accordance with the DAB standard or the DAB+ standard, slide shows containing images and texts may be synchronized with audio broadcasts. For instance, during radio broadcasting, information of the current show or song on the radio may be displayed. Alternatively, when a listener in motion receives the radio broadcasts, the listener is able to acquire regional information, such as weather, discount stores nearby, and so on. Even though DAB/DAB+ transmission of visual data relevant to the radio broadcast is allowed during the radio broadcast, an accurate time synchronization mechanism is absent. For instance, when weather information is broadcast on a radio station, and a weather forecast image is simultaneously transmitted to a listener, due to lack of accurate time synchronization mechanism, the listener may not be able to refer to the image transmitted together with the weather forecast broadcast once the reception quality or the data transmission efficiency is unfavorable. Hence, researchers of this technical field are desperate to develop technologies for synchronously and accurately broadcasting audio data and displaying visual data relevant to the broadcast audio data in good time.

SUMMARY OF THE INVENTION

In view of the above, the invention is directed to an apparatus for synchronizing audio data and visual data and a method therefor, such that the audio data and the visual data transmitted at the same time can be broadcast and displayed synchronously.

In the invention, an apparatus for synchronizing audio data and visual data is provided. The apparatus includes a splitter, a synchronization unit, an audio control unit, and a visual data processing unit. The splitter receives an application layer data frame including audio data and visual data and splits the visual data from the audio data in the application layer data frame. The synchronization unit is coupled to the splitter, receives audio timing information of the audio data, and acquires synchronization information according to the audio timing information and external timing information. The audio control unit is coupled to the splitter and the synchronization unit, receives the audio data from the splitter and temporarily stores the audio data, and outputs the audio data according to the synchronization information. The visual data processing unit is coupled to the splitter and the synchronization unit, receives the visual data from the splitter, analyzes and temporarily stores the visual data, and outputs the visual data together with the output of the audio data synchronously according to the synchronization information.

In the invention, a method for synchronizing audio data and visual data is provided. The method includes following steps. An application layer data frame including audio data and visual data is received, and the audio data and the visual data in the application layer data frame are split from each other. Synchronization information is acquired according to audio timing information of the audio data and external timing information. The audio data is temporarily stored, and the audio data is output according to the synchronization information. The visual data is analyzed and temporarily stored, and the visual data is output together with the output of the audio data synchronously according to the synchronization information.

Based on the above, an apparatus for synchronizing audio data and visual data and a method therefor are provided in the invention, such that the audio data and the visual data transmitted at the same time can be broadcast and displayed synchronously according to relevant timing information.

Other features and advantages of the invention will be further understood from the further technological features disclosed by the embodiments of the invention wherein there are shown and described embodiments of this invention, simply by way of illustration of modes best suited to carry out the invention.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

It should be mentioned that the following embodiments are provided on the premise that the DAB/DAB+ standard is applied. However, the invention is not limited thereto, and other standards for synchronizing audio data and visual data may also be applicable.

Figure 1:
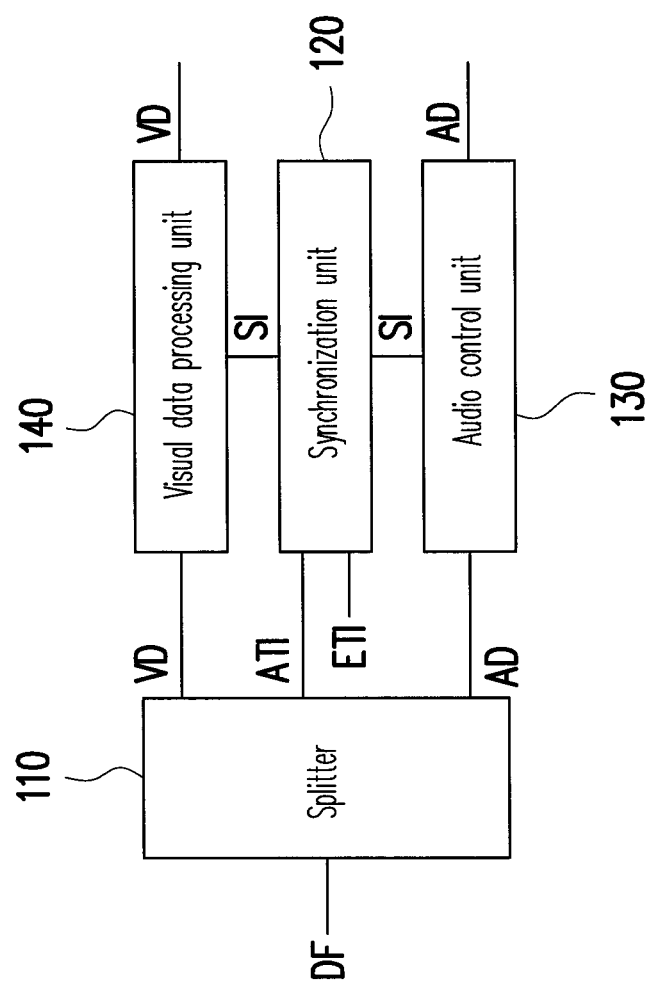
FIG. 1 and FIG. 2 are block views illustrating an apparatus for synchronizing audio data and visual data according to an embodiment of the invention.

FIG. 1 is a block view illustrating an apparatus for synchronizing audio data and visual data according to an embodiment of the invention. With reference to FIG. 1, the apparatus 10 for synchronizing audio data and visual data includes a splitter 110, a synchronization unit 120, an audio control unit 130, and a visual data processing unit 140. The splitter 110 receives an application layer data frame DF that includes audio data AD and visual data VD. After receiving the application layer data frame DF, the splitter 110 splits the audio data AD from the visual data VD in the application layer data frame DF. Here, the visual data VD includes a static image and/or a text message.

The synchronization unit 120 is coupled to the splitter 110, receives audio timing information ATI of the audio data AD, and acquires synchronization information SI according to the audio timing information ATI and external timing information ETI. The audio control unit 130 is coupled to the splitter 110 and the synchronization unit 120, receives the audio data AD from the splitter 110 and temporarily stores the audio data AD, and outputs the audio data AD according to the synchronization information SI. The visual data processing unit 140 is coupled to the splitter 110 and the synchronization unit 120, receives the visual data VD from the splitter 110, analyzes and temporarily stores the visual data VD, and outputs the visual data VD together with the output of the corresponding audio data AD synchronously according to the synchronization information SI.

Figure 2:
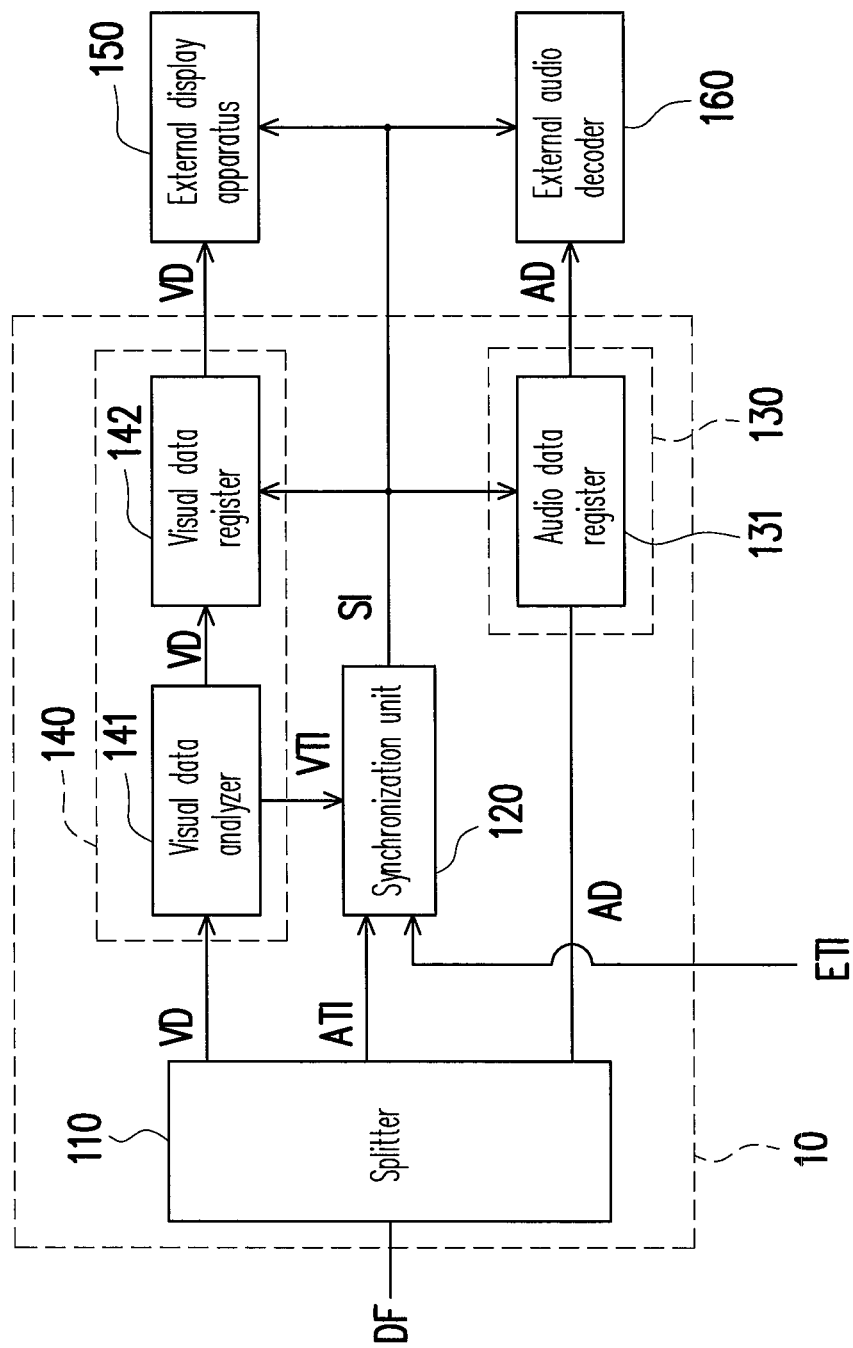

FIG. 2 is block view illustrating an apparatus for synchronizing audio data and visual data according to an embodiment of the invention. In comparison with the embodiment shown in FIG. 1, the embodiment shown in FIG. 2 is in more details. With reference to FIG. 2, components in the apparatus 10 for synchronizing audio data and visual data and correlations of these components are similar to those depicted in FIG. 1. The difference between FIG. 2 and FIG. 1 lies in that the audio control unit 130 includes an audio data register 131, and the visual data processing unit 140 includes a visual data analyzer 141 and a visual data register 142.

The visual data analyzer 141 is coupled to the splitter 110 and the synchronization unit 120. Besides, the visual data analyzer 141 analyzes the visual data VD, e.g., identify images and texts contained in the visual data VD. According to the present embodiment, the visual data analyzer 141 also provides the synchronization unit 120 with visual timing information VTI. The visual data register 142 is coupled to the visual data analyzer 141 and the synchronization unit 120, receives the visual data VD from the visual data analyzer 141, and outputs the visual data VD received by the synchronization unit 120 according to the synchronization information SI. Data processing and synchronization are also provided in the present embodiment.

As shown in FIG. 2, the splitter 110 receives the application layer data frame DF. Since the apparatus 10 is responsible for data processing at an application-layer level, the application layer data frame DF does not include any header required for data transmission but include the audio data AD and the visual data VD. The splitter 110 splits the visual data VD from the audio data AD and respectively outputs the audio data AD and the visual data VD to the audio control unit 130 and the visual data processing unit 140.

In the present embodiment, the audio data AD is compressed in the format established according to the DAB standard. For instance, when the DAB+ standard is applied, the audio data AD may be compressed in a high efficiency advanced audio coding (HE AAC) format. The visual data VD corresponds to the extended programme associated data (X-PAD) under the DAB/DAB+ standard and includes static images and/or texts that can be displayed in form of slide shows (static images) and/or dynamic labels (text). The above descriptions are provided on the condition that the DAB/DAB+ standard is applied. When different standards are applied, the corresponding configurations may be changed and should not be limited to those described in the invention.

After the audio data AD is transmitted to the audio control unit 130, the audio data AD is temporarily stored in the audio data register 131. The content and the timing information in the visual data VD are analyzed by the visual data analyzer 141 and then stored in the visual data register 142. The application layer data frame DF received by the splitter 110 does not include the header of the application layer data frame DF. However, the header of a transport data frame (including the application layer data frame DF) contains the external timing information ETI as a timing reference during data transportation. Hence, the synchronization unit 120 receives the external timing information ETI from an external apparatus (not shown), and the external timing information ETI is retrieved by the external apparatus from the header of the transport data frame, or specifically, from the Fast Information Channel (FIC) header of the DAB transmission frame). The external timing information ETI serves as the reference time for synchronizing the audio data AD and the visual data VD. In the present embodiment, the external timing information ETI is the Universal Timing Coordinated (UTC) information, while the invention is not limited thereto.

The synchronization unit 120 further receives the audio timing information ATI of the audio data AD from the splitter 110 and receives the visual timing information VTI from the visual data analyzer 141. In consideration of the external timing information ETI as the reference time, the synchronization unit 120 generates the synchronization information SI and transmits the synchronization information SI to the audio data register 131 and the visual data register 142, so as to synchronously output the audio data AD and the visual data VD. The data incorporated in the synchronization information SI may vary according to different configurations. Normally, the capacity of audio data stored in one application layer data frame DF does not exceed one second, and the most concise synchronization is to simply ensure the synchronous output of the audio data AD and the visual data VD stored in the same application layer frame data DF. Likewise, the synchronization information can be applied to achieve accurate time synchronization, while the invention is not limited thereto.

In the present embodiment, the visual data VD is transmitted from the visual data register 142 to the external display apparatus 150 to display the visual data VD; at the same time, the audio data AD is transmitted from the audio data register 131 to the external audio decoder 160, so as to decode and broadcast the audio data AD. Since the audio data AD that is decoded by the external audio decoder 160 and is then broadcast requires a certain decoding time delay, the external display apparatus 150 and the external audio decoder 160 simultaneously receive the synchronization information SI from the synchronization unit 120, so as to accurately synchronize the broadcast of audio data AD with the display of visual data VD.

Note that the apparatus 10 for synchronizing the audio data and the visual data, the external display apparatus 150, and the external audio decoder 160 may be collectively configured in a multimedia broadcast apparatus. Alternatively, the apparatus 10 for synchronizing the audio data and the visual data, the external display apparatus 150, and the external audio decoder 160 may be respectively configured in different hardware apparatuses and connected through conductive wires or network transmission. The invention is not limited thereto.

Figure 3:
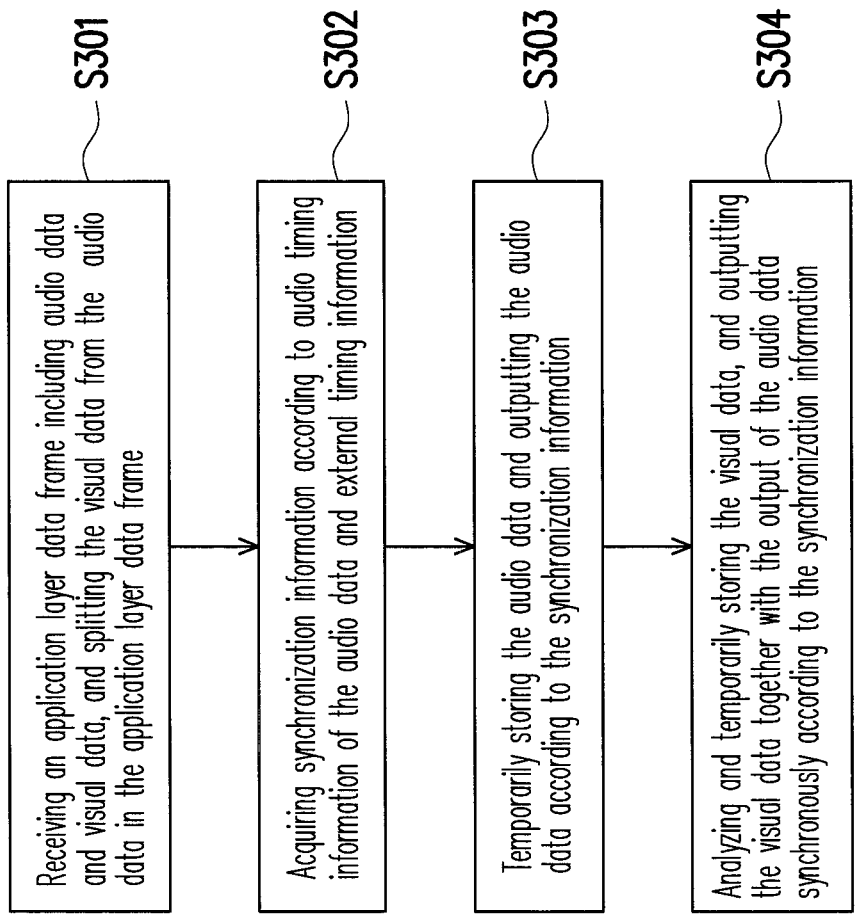
FIG. 3 is flow chart illustrating a method for synchronizing audio data and visual data according to an embodiment of the invention.

In the invention, a method for synchronizing audio data and visual data is also provided. FIG. 3 is flow chart illustrating a method for synchronizing audio data and visual data according to an embodiment of the invention. With reference to FIG.

3, in step S301, an application layer data frame including audio data and visual data is received, and the audio data and the visual data in the application layer data frame are split from each other. In step S302, synchronization information is acquired according to audio timing information of the audio data and external timing information. In step S303, the audio data is temporarily stored, and the audio data is output according to the synchronization information. In step S304, the visual data is analyzed and temporarily stored, and the visual data is output together with the output of the audio data synchronously according to the synchronization information. The detailed implementation of said method can be learned with reference to the descriptions in the previous embodiments shown in FIG. 1 and FIG. 2 and will not be further described hereinafter.

Based on the above, the invention provides an apparatus for synchronizing audio data and visual data and a method therefor. Specifically, the timing information of the audio data and the timing information of the visual data in the same data frame are used to synchronize the audio data and the visual data. Also, the external timing information (e.g., the UTC information) of the transport data frame including the audio data and visual data is also taken into account as a reference time of the synchronization. Thereby, the audio data and the visual data transmitted in the same data frame can certainly be broadcast and displayed at the same time. Aside from synchronously outputting the audio data and the visual data from the apparatus, the synchronization information may be transmitted to the external display apparatus and the external audio decoder, so as to synchronize the visual data display with the audio data broadcast. Further, the synchronization of the visual data display and the audio data broadcast is not affected by the decoding time delay of the external audio decoder.

It will be apparent to those skilled in the art that various modifications and variations can be made to the structure of the disclosed embodiments without departing from the scope or spirit of the invention. In view of the foregoing, it is intended that the invention cover modifications and variations of this invention provided they fall within the scope of the following claims and their equivalents.

What is claimed is:

1. An apparatus for synchronizing audio data and visual data, the apparatus comprising:
    a splitter receiving an application layer data frame including audio data and visual data, and splitting the visual data from the audio data in the application layer data frame;
    a synchronization unit coupled to the splitter, the synchronization unit receiving audio timing information of the audio data from the splitter and acquiring synchronization information according to the audio timing information and an external timing information. an audio control unit coupled to the splitter and the synchronization unit, the audio control unit receiving the audio data from the splitter and temporarily storing the audio data, and outputting the audio data according to the synchronization information; and
    a visual data processing unit coupled to the splitter and the synchronization unit, the visual data processing unit receiving the visual data from the splitter, analyzing and temporarily storing the visual data, and outputting the visual data together with the output of the audio data synchronously according to the synchronization information.

2. The apparatus as recited in claim 1, wherein the visual data is an image or a text message.

3. The apparatus as recited in claim 1, wherein the visual data processing unit outputs the visual data to an external display unit,
    the audio control unit outputs the audio data to an external audio decoder, and
    the external display unit and the external audio decoder respectively receive the synchronization information, so as to synchronously display the visual data and broadcast the audio data.

4. The apparatus as recited in claim 1, wherein the visual data processing unit comprises:
    a visual data analyzer coupled to the splitter and the synchronization unit, the visual data analyzer analyzing the visual data and providing the synchronization unit with visual timing information of the visual data; and
    a visual data register coupled to the visual data analyzer and the synchronization unit, the visual data register receiving the visual data from the visual data analyzer and temporarily storing the visual data, and receiving the synchronization information from the synchronization unit to output the visual data according to the synchronization information.

5. The apparatus as recited in claim 4, wherein the synchronization unit further receives the visual timing information of the visual data from the visual data analyzer and generating the synchronization information according to the visual timing information, the audio timing information, and the external timing information.

6. The apparatus as recited in claim 1, wherein the audio control unit includes an audio data register coupled to the splitter and the synchronization unit, and the audio data register temporarily stores the audio data and outputs the audio data according to the synchronization information.

7. The apparatus as recited in claim 1, wherein the synchronization unit receives the external timing information from an external apparatus, the external timing information is retrieved by the external apparatus from a header of a transport data frame, and the transport data frame includes the application layer data frame.

8. A method for synchronizing audio data and visual data, the method comprising:
    receiving an application layer data frame including audio data and visual data, and splitting the visual data from the audio data in the application layer data frame;
    acquiring synchronization information according to audio timing information of the audio data and external timing information;
    temporarily storing the audio data and outputting the audio data according to the synchronization information; and
    analyzing and temporarily storing the visual data, and outputting the visual data together with the output of the audio data synchronously according to the synchronization information.

9. The method as recited in claim 8, wherein the visual data is an image or a text message.

10. The method as recited in claim 8, further comprising:
    outputting the visual data to an external display unit;
    outputting the audio data to an external audio decoder; and
    synchronously displaying the visual data on the external display unit and broadcasting the audio data on the external audio decoder according to the synchronization information.

11. The method as recited in claim 8, wherein the step of analyzing and temporarily storing the visual data comprises:
    analyzing the visual data to acquire visual timing information of the visual data.

12. The method as recited in claim 11, wherein the step of acquiring the synchronization information according to the audio timing information of the audio data and external timing information comprises:
    acquiring the synchronization information according to the audio timing information, the external timing information, and the visual timing information.

13. The method as recited in claim 11, before the step of acquiring the synchronization information according to the audio timing information of the audio data and the external timing information, the method further comprising:
    receiving the external timing information from an external apparatus, the external timing information being retrieved by the external apparatus from a header of a transport data frame, wherein the transport data frame includes the application layer data frame.

\* \* \* \* \*